United States Patent

[11] 3,586,793

[72] Inventor John C. Neal
214 St. Christopher Lane, Columbus, Ohio 43201

[21] Appl. No. 739,124
[22] Filed June 21, 1968
[45] Patented June 22, 1971

[54] TWO WAY REPEATER
11 Claims, 9 Drawing Figs.

[52] U.S. Cl. ........................................................ 179/170.2, 178/70

[51] Int. Cl. ........................................................ H04b 3/20, H04l 25/52

[50] Field of Search ........................................... 178/71; 179/170, 170 H, 170 NC, 170 T, 170.2, 170.6, 170.8

[56] References Cited

UNITED STATES PATENTS

| | | | |
|---|---|---|---|
| 2,598,159 | 5/1952 | Gardere | 179/170.4 X |
| 3,238,310 | 3/1966 | Wells | 179/170 T |
| 3,419,682 | 12/1968 | Thompson et al. | 179/170.2 X |

*Primary Examiner*—Kathleen H. Claffy
*Assistant Examiner*—William A. Helvestine
*Attorney*—Frank H. Foster

ABSTRACT: A two-way two-wire repeater is disclosed comprising two oppositely directed amplifiers coupled to a transmission line. The repeater is provided with a series capacitor and diode connected to feed a portion of the signal at the output of a stage of one amplifier to the input of a stage of the oppositely directed amplifier. This feed-across path eliminates the need for "hybrid coil" coupling by deforming amplifier oscillation into pulses and permitting the pulses to be amplitude or height modulated.

INVENTOR.
JOHN C. NEAL
BY Frank H Foster
ATTORNEY

INVENTOR.
JOHN C. NEAL
BY Frank H. Foster
ATTORNEY

TWO WAY REPEATER

BACKGROUND OF THE INVENTION

This invention relates to systems for amplifying signals in two directions, and more particularly relates to two-way two-wire repeaters such as those common in telephone systems.

A repeater amplifier must be capable of amplifying signals originating at both ends of a transmission line which is connected between conversing parties. Merely interconnecting a pair of oppositely directed amplifiers at an appropriate position in a transmission line would cause the amplifiers to oscillate or "sing." This is obvious because each amplifier would provide a closed feedback loop from the output of the opposite amplifier to the input of the opposite amplifier.

Conventionally, the harmful effects of such feedback is overcome by using special transformers known as "hybrid coils." These permit coupling of the output and the input of each amplifier to the transmission line while preventing coupling from the output of each amplifier to the input of the other.

In U.S. Pat. No. 2,598,159, H. Gardere shows a system for making one of two oppositely directed amplifiers completely inoperative when the other is amplifying a signal. This is done by rectifying and filtering the transmitted information signal and using the resultant DC thereby obtained to bias the other amplifier to render it inoperative.

For voice conversations between two parties, the Gardere system seems effective. However, in this day of rapid data transmission and the use of carriers for multiple conversations, the Gardere system would not be effective. First, in the Gardere system there would be a time delay between the end of a transmission in one direction and the return of the previously inoperative amplifier to an operative state. The time would be required for discharging the filter capacitors. Second, the Gardere system would be incapable of amplifying simultaneous two-way transmissions which might be transmitted on two carriers since such operation would require simultaneous transmission in both directions.

It is therefore an object of my invention to provide an improved two-way repeater.

Another object of my invention is to permit an oscillatory system to transmit an information signal.

Another object of my invention is to provide a two-way repeater which eliminates the need for expensive and sensitive hybrid coils and which permits use of conventional three-winding audio transformers.

Another object of my invention is to provide a method for passing a signal through a pair of oppositely directed amplifiers in which regenerative feedback is permitted.

Another object of my invention is to provide a repeater capable of simultaneous two-way transmission.

Another object of my invention is to control and usefully use the oscillations which will arise in a looped system.

Further objects and features of my invention will be apparent from the following specification and claims when considered in connection with the accompanying drawings illustrating my invention.

SUMMARY OF THE INVENTION

I have found that the above objects can be accomplished in a two-way repeater of the type having oppositely directed amplifiers and coupling means, for coupling the output of a first amplifier and the input of a second amplifier to a transmission line and for coupling the output of the second amplifier and the input of the first to another transmission line, wherein the improvement comprises means in addition to the coupling means for impressing a portion of the time varying signal of one amplifier on the other amplifier.

More specifically, these objects may be attained in a circuit as described above if each of the oppositely directed amplifiers comprises a plurality of stages and the impressing means comprises a first series capacitance and rectifier connected between the output of a stage of one amplifier and an input of a stage of the other amplifier. The rectifier, usually a simple semiconductor diode, is directed to permit impression at said input of that portion of the time-varying signal at said output which has a polarity tending to reduce the gain of, or cut off, the stage into which the portion is fed.

Oscillations occur in my circuit, and, because the oppositely directed amplifiers form a closed loop, the impressing means can degenerate the oscillation swing of one half-cycle while permitting regeneration of the other half-cycle. The regenerated half-cycle forms pulses which may be amplitude modulated. The capacitance in the impressing means is selected to maximize passage of the oscillation frequency while minimizing passage of a modulating information signal.

DESCRIPTION OF THE VIEWS

Figure 1:
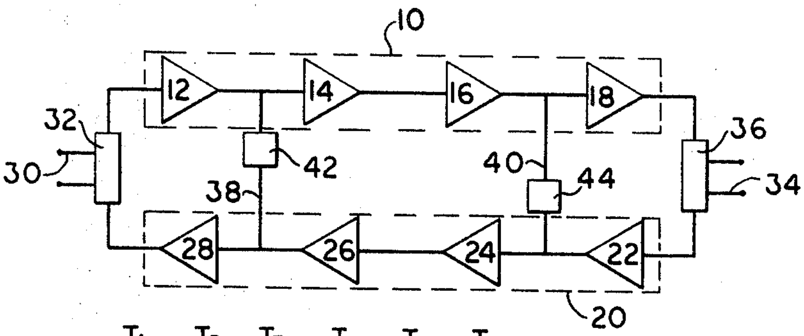
FIG. 1 is a block diagram illustrating the preferred embodiment of my invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

In FIG. 1, I show a block diagram illustrating an embodiment of my invention. The circuit of FIG. 1 has a first amplifier 10 which comprises four stages 12, 14, 16, and 18, and a second oppositely directed amplifier 20 comprising four stages 22, 24, 26, and 28. The input to the first amplifier 10 (i.e. the input to stage 12) and the output of the second amplifier (i.e. the output of stage 28) are coupled to a transmission line 30 by a coupling means 32. Similarly, the input of the second amplifier 20 and the output of the first amplifier 10 are coupled to the transmission line 34 by a coupling means 36.

A conventional repeater would consist of the two oppositely directed amplifiers 10 and 20 and two hybrid coil-coupling means. I have found that by adding two feed-across paths 38 and 40 of the type to be described, I have eliminated the need for "hybrid coil" coupling means. The coupling means 32 and 36 of my invention may be ordinary three winding transformers.

The feed-across path 38 comprises a signal-impressing means 42 connected to impress a portion of the signal of the second amplifier 20 on the amplifier 10. I illustrate, for example, the output of stage 26 connected to impress a signal at the input of stage 14. Similarly, a portion of the signal in the first amplifier 10 is fed across a path 40 through an impressing means 44 to the second amplifier 20 so that a portion of the output of stage 16 is impressed on the input of stage 24.

In the circuit of FIG. 1 each amplifier has a feedback loop comprising the oppositely directed amplifier and both coupling means. Without the signal impressing means 42 and 44 the circuit would produce extreme nonlinear oscillation making impossible the transmission of information from either transmission line to the other. By providing signal impressing means 42 and 44 according to my invention I change the operation of the circuit to permit information transmission.

The oscillation resulting from the closed loop system, regardless of how distorted, will tend to swing first in one polarity and then in the opposite polarity My invention degenerates or destroys the oscillation swings of one half cycle of oscillation swing while permitting regeneration of the opposite half cycle. Regeneration of one half-cycle is provided by the closed loop comprising the two amplifiers and the coupling means. Degeneration of the other half-cycle is provided by the signal-impressing means 42 and 44. Of course, the degenerative effect of the signal impressing means 42 and 44 on the degenerated half-cycle must be greater than the regenerative effect of the closed loop on that same half-cycle.

Degenerative feed-across is obtained by using a series diode and capacitance as the impressing means 42 and as the impressing means 44. The oscillation swing which is regenerated will be the one which causes the diode to conduct. The phase relationship between the output of stage 26 and the input to stage 14 is such that the pulse of the regenerated polarity will arrive through the signal-impressing means at the input of stage 14 at the same time the degenerated half-cycle will arrive at the same input from the prior stage. The pulse arriving at the input through the diode is of such a polarity that it cuts off stage 14 for its duration, thus assuring and reinforcing the absence of any pulse in the degenerated half-cycle. In the subsequent half-cycle of operation, the diode of the impressing means 42 will be reverse biased. Stage 14 will be in conduction and will transmit and amplify the regenerated pulse then arriving at its input. Signal-impressing means 44 operates similarly. I have found that one impressing means will provide satisfactory operation but I prefer to use two.

The result is that a series of pulses, ideally a square wave, circulate around the loop. At the input of two stages in the loop, such as stages 14 and 24, the absence of a pulse from the preceding stage coincides with the presence of a pulse through the impressing means which assures that the stages 14 and 24 are cut off for the duration of the pulse. The pulse fed across ideally destroys any oscillation which would begin during its presence. The absence of a pulse through the impressing means coincides with the presence of a pulse from the preceding stage. This pulse from the preceding stage may then be transmitted through the stage. An information signal may be transmitted through the amplifier by amplitude modulating these pulses with the information signal.

Figure 2:
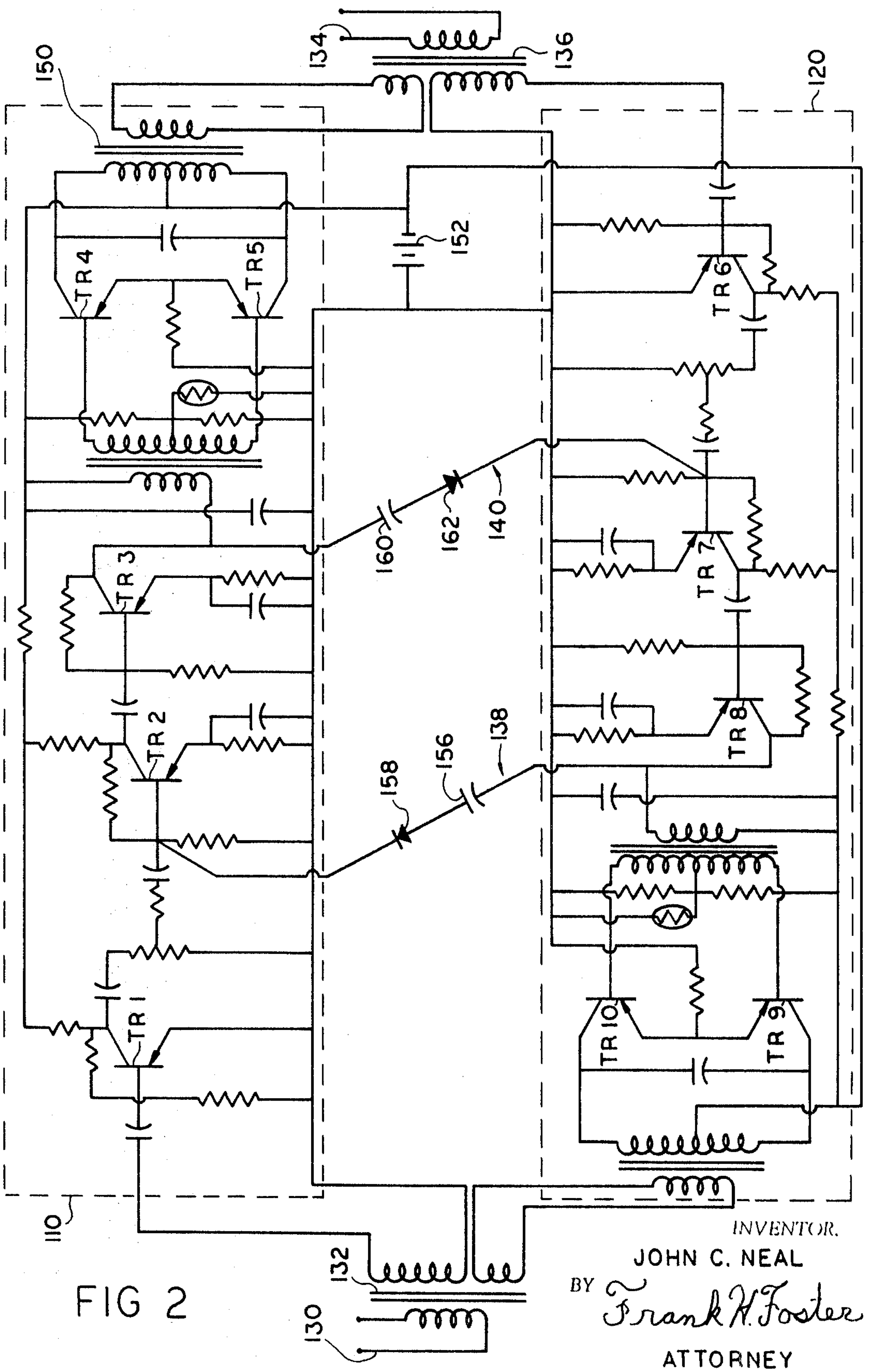
FIG. 2 is a schematic circuit diagram of a specific embodiment of my invention.

In FIG. 2, I show a schematic diagram of a specific embodiment of my invention. It comprises a first amplifier 110 coupled to an oppositely directed second amplifier 120. The input of the first amplifier 110 and the output of the second amplifier 120 are coupled to a transmission line 130 by means of a first transformer 132. Similarly, a second transformer 136 couples the output of the first amplifier 110 and the input of the second amplifier 120 to the transmission line 134. I shall refer to these transformers in a general manner as "coupling means."

The two amplifiers 110 and 120 which I have used, are identical and therefore a description of one serves as a description of the other. Each amplifier comprises four conventionally designed audio stages. Transistors TR 1, TR 2 and TR 3 are the active elements for the first three single-ended stages of the amplifier 110. Transistors TR 4 and TR 5 comprise the active elements of a push-pull output stage having a push-pull output transformer 150 connected to the coupling means 136.

Since these are conventional amplifiers, using conventional design considerations, many variations and modifications will be obvious to those skilled in the art. For some telephone use or certain carrier use, changes may be desirable. Both amplifiers are powered by a power supply 152.

The circuit of FIG. 2 is unique because it uses coupling means 132 and 136 which are not hybrid coils and because I have provided two feed-across paths 138 and 140. The feed-across path 138 comprises a capacitor 156 and a rectifier 158, and feeds a portion of the time-varying output of transistor TR 8 onto the input of transistor TR 2. Similarly, the feed-across path 140 comprises a capacitor 160 and a rectifier 162 and feeds a portion of the time-varying output of transistor TR 3 onto the input of transistor TR 7. I have used capacitors with a capacitance of 0.1 mfd. and rectifier diodes of the type IN602. I use the term rectifier to indicate a device which permits current flow in one direction while preventing substantial current flow in the opposite direction, and do not use it to include a rectifier with a power supply filter as that term is sometimes used.

I have found that by use of the feed-across paths 138 and 140, described above, I am able to pass an information signal in either direction or simultaneously in both directions from transmission line to transmission line. Although I have found that such operation occurs, I am not absolutely certain of the explanation of its operation. Consequently, having described my invention to enable a person skilled in the art to make and use it, I will explain in greater detail my theory of its operation. It should be understood that all the operation I describe in this application is merely my best opinion.

OPERATION

Figure 3:
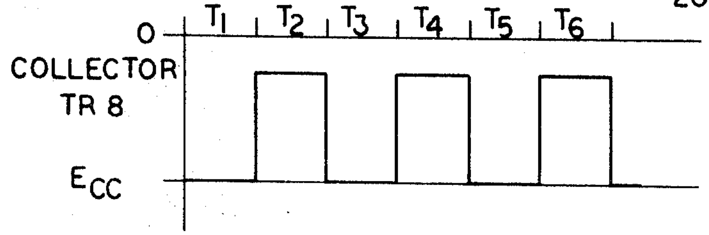
FIG. 3 is a diagram of the ideal voltage waveform present at the collector of transistor TR 8 of the circuit of FIG. 2.
Figure 4:
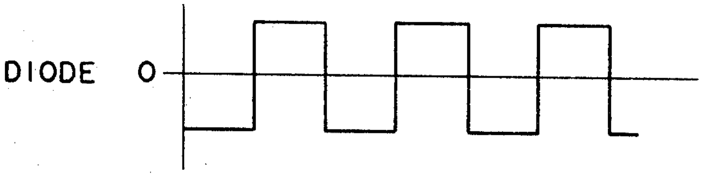
FIG. 4 is a diagram of the ideal voltage waveform present at the input to the diode of my impressing means illustrated in FIG. 2.
Figure 5:
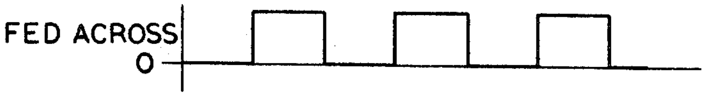
FIG. 5 is a diagram of the ideal voltage waveform fed across onto the input of transistor TR 2 of the circuit of FIG. 2.

The operation is illustrated in FIGS. 3—8 which represent the input to and output from transistor TR 2 under ideal steady-state conditions. The operation of TR 7 will be the same. We begin with the hypothesis that a square wave is circulating around the loop. The assumed square wave is illustrated in FIG. 3 as the voltage on the collector of TR 8. This voltage swings between the supply voltage $E_{cc}$, when TR 8 is cut off, and a level determined by the input to TR8. The same waveform is shifted to a zero average by the capacitor 156 as shown in FIG. 4 and has its negative portion clipped by the diode. FIG. 5 shows the resulting pulse fed across the feed-across path 138 and impressed on the input of TR 2.

Figure 6:
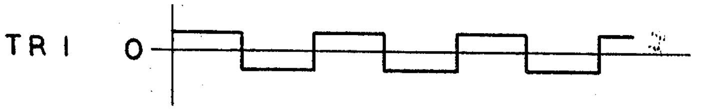
FIG. 6 is a diagram of the ideal voltage waveform fed onto the input of Transistor TR 2 from the preceding stage of transistor TR 1 as illustrated in FIG. 2.
Figure 7:
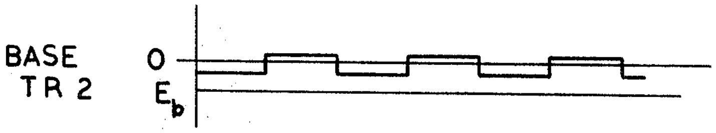
FIG. 7 is a diagram of the ideal total voltage waveform present at the input to transistor TR 2 illustrated in FIG. 2.
Figure 8:
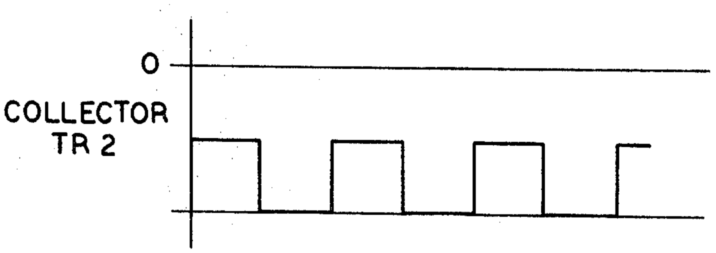
FIG. 8 is a diagram of the ideal voltage waveform present at the collector of transistor TR 2 illustrated in FIG. 2.
Figure 9:
FIG. 9 is an oscillogram of the actual voltage observed at the collector of the transistor TR 8 illustrated in FIG. 2.

In FIG. 6, the pulse from TR 1 is illustrated as it arrives at the base of TR 2. Its polarity is opposed to that of the pulses fed across the path 138. The total input to TR 2 as a result of the algebraic addition of the base bias $E_b$, the fed-across pulses of FIG. 5 and the pulses from TR 1 (FIG. 6) is illustrated in FIG. 7. During the time intervals $t_2$, $t_4$, and $t_6$, the fed-across pulses of FIG. 5 drive TR 2 into cutoff for their duration. During the time intervals $t_1$, $t_3$, and $t_5$, the feed-across path is, to an approximation, disconnected from TR 2 so that the pulses from TR 1 may be amplified and appear in the collector as illustrated in FIG. 8.

The pulse height at the collector of TR 2 is dependent upon the pulse height from TR 1 during intervals $t_1$, $t_3$, and $t_5$, yet during the intervals $t_2$, $t_4$, and $t_6$ TR 2 is cut off. Here is the main point of my invention. Pulses are permitted to build up during certain intervals. The pulses which do build up are circulated around the loop and fed across to assure that no pulse or oscillation can build up during intermediate intervals. The pulses which do build up are fed across in the proper phase to clamp a collector to the supply voltage during the absence of a pulse at that collector.

The transient buildup of this circuit to this condition is similarly explained. Assume that an oscillation begins at the natural frequency of the closed loop and is exponentially increasing. The loop comprises the two oppositely directed amplifiers 110 and 120 and the coupling means 132 and 136. This oscillation can be described as swinging first to one polarity during a first half cycle A and then to the opposite polarity during a second half cycle B.

As this oscillation increases, the diode will conduct for one polarity and not for the other. In the embodiment I illustrate, it will conduct for the positive going pulses at the collector of TR 8 which I will assume is during half-cycle B. The fed-across positive-going pulse of half cycle B algebraically adds at the input of TR 2 to the negative-going pulse of half-cycle A simultaneously arriving from the output of TR 1. Because the two components arrive 180° out of phase, the fed-across pulse will destroy or at least degenerate the pulse from TR 1.

During the interval that half-cycle A is at the collector of TR 8, however, no pulse is fed across because the diode will be reverse biased. The half-cycle B then simultaneously arriving at the input to TR 2 will pass through TR 2. The half-cycle of B is amplified and circulated around the loop. Regeneration can occur for pulses of half-cycle B. Pulses of half-cycle B will regenerate around the loop while pulses of half-cycle A will be degenerated and destroyed by my feed-across system. The result is that buildup of oscillation results in the oscillations of one polarity being clipped by cutting off of a transistor during one half-cycle and in effect clamping the resulting square wave to ground (or to the supply voltage). Obviously, I use the word "half-cycle" broadly to indicate a portion of a cycle. The pulse width may be more than or less than one half of a cycle.

TR 2 TR2 is conducting, the pulse height is modulated by the information signal which is thereby transmitted through the amplifier. It is obvious that the pulse rate (i.e. chopping rate or sampling rate) must be greater than the information signal frequency. The capacitors 156 and 160 should be chosen to maximize passage of frequencies at the pulse rate but to minimize passage at the information frequency. The capacitor serves as a rough high pass filter and obviously more sophisticated high pass or band-pass filters could be used.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. In a two-way repeater of the type having oppositely directed amplifiers, and coupling means for coupling the output of a first amplifier and the input of a second amplifier to a transmission line and for coupling the output of the second amplifier and the input of the first amplifier to another transmission line, the improvement comprising:

means, in addition to the coupling means, for impressing a portion of the time-varying signal of an amplifier on the other amplifier wherein said impressing means comprises a capacitance and said capacitance is selected to maximize passage of the oscillation component while minimizing passage of the information component of the signal.

2. In a two-way repeater of the type having oppositely directed amplifiers, and coupling means for coupling the output of a first amplifier and the input of a second amplifier to a transmission line and for coupling the output of the second amplifier and the input of the first amplifier to another transmission line, the improvement comprising:

means, in addition to the coupling means, for impressing a portion of the time-varying signal of an amplifier on the other amplifier wherein said impressing means comprises a series capacitance and rectifier, 3. In a two-way repeater of the type having oppositely directed amplifiers, and coupling means for coupling the output of a first amplifier and the input of a second amplifier to a transmission line and for coupling the output of a second amplifier and the input of the first amplifier to another transmission line, the improvement comprising:

means, in addition to the coupling means, for impressing a portion of the time-varying signal of an amplifier on the other amplifier wherein said signal-impressing means is connected between a stage of each amplifier, which stages are selected to provide an impressed signal through said impressing means and impressed upon the input of a selected stage which impressed signal contains an oscillation component opposing any oscillation component of a selected polarity at said input which is present from the output of a stage preceeding said selected stage.

4. A circuit according to claim 3, wherein said impressing means comprises:

a. a first series capacitance and rectifier connected between an output of a stage of a first amplifier and an input of a stage of a second amplifier; and b. a second series capacitance and rectifier connected between an output of a stage of the second amplifier and an input of a stage of the first amplifier.

5. A circuit according to claim 4, wherein said rectifier is connected to provide a voltage which opposes the biasing voltage at said input.

6. In a two-way repeater of the type having oppositely directed amplifiers, and coupling means for coupling the output of a first amplifier and the input of a second amplifier to a transmission line and for coupling the output of the second amplifier and the input of the first amplifier to another transmission line, the improvement comprising:

means, in addition to the coupling means, for impressing a portion of the time varying signal of an amplifier on the other amplifier wherein a. each amplifier comprises a plurality of audio amplifier stages, each stage having an input and an output; and b. said impressing means comprises i. a first series capacitance and rectifier connected between the output of a stage of the first amplifier, and the input of a stage of the second amplifier, the capacitance being selected to maximize passage of the oscillation component while minimizing passage of the information component of the total time varying signal, the stages being selected to provide degeneration of one half cycle of the swing of the oscillation component; and ii. a second series capacitance and rectifier connected between the output of a stage of the second amplifier and the input of a stage of the first amplifier, the capacitance being selected to maximize passage of the oscillation component while minimizing passage of the information component of the total time-varying signal, the stages being selected to provide degeneration of said one half cycle of the swing of the oscillation component.

7. In a two-way repeater of the type having oppositely directed amplifiers, and coupling means for coupling the output of a first amplifier and the input of a second amplifier to a transmission line and for coupling the output of the second amplifier and the input of the first amplifier to another transmission line, the improvement comprising:

means, in addition to the coupling means, for impressing a portion of the time-varying signal of an amplifier on the other amplifier wherein said impressing means degenerates the swing of an oscillation component in one polarity while permitting the oscillation component to swing in the other polarity.

8. A circuit according to claim 7, wherein said impressing means comprises means for deforming the oscillation component into pulses.

9. A circuit according to claim 8, wherein means is provided for amplitude modulating said pulses by an information signal.

10. A circuit according to claim 9, wherein said impressing means comprises:

a. a first series capacitance and rectifier connected between an output of a stage of a first amplifier and an input of a stage of a second amplifier; and b. a second series capacitance and rectifier connected between an output of a stage of the second amplifier and an input of a stage of the first amplifier.

11. A circuit according to claim 10, wherein said rectifiers are directed to permit impression of that portion of said time-varying signal which has a polarity tending to reduce the gain of each amplifier.